United States Patent

Jones et al.

[15] 3,670,068

[45] June 13, 1972

[54] PROCESS OF SPINNING A NOVEL MODACRYLIC FIBER

[72] Inventors: Wilford Donald Jones, Jenkintown, Pa.; James Peter Baldino, Westmont, N.J.; Sidney Melamed, Elkins Park, Pa.

[73] Assignee: Rohm & Haas Company, Philadelphia, Pa.

[22] Filed: March 4, 1969

[21] Appl. No.: 833,214

Related U.S. Application Data

[62] Division of Ser. No. 586,929, Oct. 17, 1966, Pat. No. 3,516,903.

[52] U.S. Cl. ........................................... 264/182, 264/210 F
[51] Int. Cl. .......................................... D01f 7/00, D01f 3/10
[58] Field of Search ........................... 264/182; 260/29.6 PM

[56] References Cited

UNITED STATES PATENTS

| | | | |
|---|---|---|---|
| 2,914,376 | 11/1959 | Bibolet et al. | 264/182 |
| 3,067,167 | 12/1962 | Lynn et al. | 264/182 |
| 3,073,669 | 1/1963 | Fuirsaki et al. | 264/182 |
| 3,078,243 | 2/1963 | Bibolet et al. | 264/182 |
| 3,107,971 | 10/1963 | Yasawa et al. | 264/182 |
| 3,140,265 | 7/1964 | Richter et al. | 260/2.1 |
| 3,336,428 | 8/1967 | Walters et al. | 264/182 |
| 3,410,941 | 11/1968 | Dagon et al. | 264/182 |
| 3,233,026 | 2/1966 | Richter et al. | 264/182 |
| 3,502,745 | 3/1970 | Minton | 260/29.4 |

FOREIGN PATENTS OR APPLICATIONS

| | | | |
|---|---|---|---|
| 695,332 | 9/1964 | Canada | 264/182 |

*Primary Examiner*—Jay H. Woo
*Attorney*—George W. F. Simmons and Carl A. Castellan

[57] ABSTRACT

A method of making a modacrylic fiber, said fiber having a skin wherein the chlorine and nitrogen content are each at least 20 percent less than in the core of the fiber. The skin effect occurs when certain critical copolymer compositions of acrylonitrile and vinylidene chloride are used and when particular spinning bath conditions are employed, namely, spinning into 65–75 percent nitric acid at from about 75°–100° C.

10 Claims, No Drawings

PROCESS OF SPINNING A NOVEL MODACRYLIC FIBER

This is a division of Ser. No. 586,929, filed Oct. 17, 1966 and now U.S. Pat. No. 3,516,903. inserted.

This invention relates to a new process for the preparation of shaped articles from aqueous dispersions of acrylonitrile-vinylidene chloride copolymers. More particularly, it relates to the production of fibers from acrylonitrile-vinylidene chloride copolymer latexes using multi-filament or multi-hole spinning jets and to the fibers so produced.

At the present time, a large variety of polymers is used in the production of synthetic fibers. Probably no group has greater chemical variety than the acrylonitrile polymers. Pure polyacrylonitrile has an exceptional combination of physical properties making it highly desirable for fiber-forming purposes. However, difficulties of handling and processing this material have made it undesirable to prepare commercial fibers from pure polyacrylonitrile. Accordingly, a variety of modifying monomers have been used to prepare acrylonitrile-containing copolymers which are then spun into fibers. Those which contain at least 85 percent acrylonitrile are termed "acrylic fibers" and those which contain 35 to 85 percent are called "modacrylics." Acrylic fibers possess a highly desirable combination of properties including high stick temperature, excellent UV durability and good tenacity. Unfortunately, they also possess a higher degree of flammability than is desirable.

The modacrylics which are now used commercially contain either vinyl chloride or vinylidene chloride as the principal comonomer for the acrylonitrile. The presence of large amounts of such halogen-containing monomer units in the copolymer imparts a high degree of flame resistance to the resulting composition. While the commercial modacrylics possess excellent flame resistance, the presence of large amounts of halogen-containing monomer units results in a considerable falling off in other desirable properties. Thus, as compared to commercial acrylic fibers, commercial modacrylics are characterized by substantially lower resistance to ultraviolet light, poor dimensional stability at elevated temperatures, and substantially lower stick temperatures.

It is believed that all commercially-produced acrylic and modacrylic fibers are made using either dry or wet spinning processes. More recently there has been discovered a process wherein fibers and films are spun from particulate dispersions of thermoplastic polymers, which process is termed "emulsion spinning." This process makes possible the formation of fibers and films from high molecular weight materials. Further, it simplifies the formation of polymer alloys for use in film and fiber applications.

In the preferred method of emulsion spinning, a particulate dispersion or latex of a thermoplastic polymer is prepared using an acid-sensitive surfactant. The latex is then spun into an appropriate acidic medium thereby coagulating the dispersion. When such a dispersion is coagulated, the separate particles of the latex (now forming the thread or film) tend to preserve their separate identity producing shaped articles having little composite strength. In order to unify the structure and to obtain fibers or films having sufficient coherent strength for handling, additional steps must be taken to fuse or coalesce the particles into a coherent, unitary whole. Thus, unlike the conventional processes of melt spinning, dry spinning and wet spinning, emulsion spinning involves not only coagulating the polymer into the desired shaped structure, but also coalescing that fiber as described.

The materials which are active to coalesce the fiber are, by definition, softening or fusing agents. Materials which render the individual particles sufficiently tacky to adhere to each other in a unitary shaped structure also tend to tackify the macro-structure, i.e., they tend to cause adjacent filaments to adhere to each other. Accordingly, it has proven exceedingly difficult to obtain multi-filament spinning (i.e., the spinning of a multi-filament bundle or "yarn") using the emulsion spinning process.

Three processes for obtaining multi-filament spinning under these conditions have been described. The one uses complicated mechanical equipment employing a belt to support the coagulating fibers and holding them apart until fusion or coalescence occurs. This is not true multi-filament spinning since the fibers must be maintained out of contact with each other by the apparatus during the initial spinning process.

The second method utilizes a two-bath procedure in which the concentration of the coalescing material is carefully regulated. In this process the coagulating bath itself contains not only a coagulating acid but also a relatively low concentration of solvating material. The second bath is the solvating bath proper and contains a slightly higher concentration of solvating agent. Thus, the coagulating bath preferably contains nitric acid in a concentration of 40–45 percent by weight and is maintained at a temperature of from 70°–90° C. while the solvating bath contains nitric acid at a concentration of from 55–60 percent by weight and is maintained at about room temperature. Under these carefully controlled conditions multi-filament spinning is possible, although if it is desired to maintain fiber integrity through to the take-up portion of the machine, appropriate lubricants, as silicone oils, must be used in the spinning process itself. Moreover, even under these conditions, points of tackification occur which require fiber separation.

The third method utilizes a gellable matrix-forming material to provide temporary support for the coagulated latex particles, uses only very low-solids dispersions in multi-filament spinning, and generally uses weirs and similar devices.

It is apparent that all presently known processes for multi-filament spinning latexes to produce acrylic or modacrylic fibers entail significant difficulties and drawbacks. Moreover, so far as we are aware, no prior art process for multi-filament spinning a latex to produce an acrylic or modacrylic fiber has been able to spin for any significant period of time without producing at least points of tackification resulting in irregular areas of fiber-to-fiber cementation.

Now, in accordance with the instant invention, there has been discovered a multi-filament spinning process for producing modacrylic fibers which fibers provide a new dimension in flame-resistance and outdoor durability. Moreover, they combine excellent tenacity with a marked increase in ultraviolet durability and stick temperature. These results are achieved by spinning a latex of an acrylonitrile-vinylidene chloride copolymer through a multi-filament spinneret into hot, concentrated nitric acid. The use of such strongly solvating conditions should normally promote cementation of the filaments in the filament bundle. In fact, the opposite effect is obtained, i.e., the filaments preserve their individual integrity to an extent never previously observed in emulsion spinning. This is due to the copolymer reacting under these conditions to form a hard, non-tacky skin. This skin forms a thin sheath around each filament which protects the filament during the critical stages in the spinning process where cementation normally occurs. The chemical nature of the skin is not known. As compared to the copolymer, the skin is characterized by a substantial reduction in nitrogen content and by a significant reduction in chlorine content. In processing the finished fiber into fabric, the skin does not interfere so that the fabric may be dyed and processed like other modacrylics.

The composition of the copolymer is critical. Thus the copolymer must contain from about 45–55 percent by weight of acrylonitrile and, correspondingly from 55–45 percent vinylidene chloride. Optionally, up to 5 percent by weight of other copolymerizable monomers as hereinafter defined may be used so long as neither acrylonitrile nor vinylidene chloride is less than 45 percent of the copolymer. While the composition is critical, the precise limits of monomer ratios needed for adequate skin formation may vary somewhat from those stated. Decreasing either the acrylonitrile or the vinylidene chloride to 40 percent or less of the copolymer reduces the skin (if it does not eliminate it) to the point where at least partial cementation occurs. Skin thickness appears to be increased by higher levels of anionic surfactants. In general a 50/50 copolymer is optimum for skin formation; a 45–55/55–45 copolymer has adequate skin for multi-filament spinning; and somewhere between 40 and 45 percent of either acrylonitrile or vinylidene chloride (depending on surfactant concentration in the latex, the temperature and concentration of the nitric acid and the amount and type of handling), the skin becomes inadequate to prevent cementation if it does not disappear completely.

The nature of the spinning bath is also critical. Apparently, strong oxidizing and hydrolyzing conditions are essential for the chemical changes that cause skin. The spinning bath should contain from 65–70 percent by weight of nitric acid and should be at from 75°–100° C. It is preferred to use constant boiling nitric acid.

The copolymer latex used in the process of the invention is prepared by emulsion copolymerization using a free radical catalyst. The resulting latex will have a particle size of from 300–2,000 angstroms. The art of emulsion polymerization is well known and the conditions of polymerization used in preparing the copolymer latexes used herein are not critical. The aqueous emulsions are made using one or more anionic emulsifiers, optionally with one or more nonionic emulsifiers. The amount of emulsifier may range from about 0.3 to 6 percent by weight based on the weight of the total monomer charge. Too much surfactant interferes with spinning. Lower surfactant levels, within the ranges given, result in latexes having a desirable low particle size. However, such latexes generally have poor shelf and sheer stability. For optimum skin formation it is preferred to use from about 0.5 to 3 percent of emulsifier. If desired, the polymerization can be carried out at a low surfactant level and additional surfactant added after polymerization.

The free radical catalyst may be either water-soluble or oil-soluble. The invention contemplates the use of any of the free radical catalysts known to the art as effective to catalyze the polymerization of the monomers used herein. Particularly preferred are the peroxy catalysts and the azo-type catalysts. Typical catalysts which may be used are peroxides, such as hydrogen peroxide, dibutyl peroxide, acetyl peroxide, benzoyl peroxide; alkyl percarbonates; hydroperoxides, such as t-butyl-hydroperoxide, cumene hydroperoxide, p-menthane hydroperoxide, etc.; perborates as the alkali metal and ammonium perborates; persulfates as the alkali metal and ammonium persulfates; etc. Other catalysts such as $\beta,\beta'$-azodiisobutyronitrile, diazoaminobenzene, etc. can be used. The quantity of catalyst used can be varied depending on the monomer, the temperatures and the method of addition. Generally from about 0.001 to 5 percent by weight, based on the weight of the monomers, is used. If desired, catalyst may be omitted and ultraviolet radiation used for the polymerization.

The catalyst may be used with a redox system. A buffer may be used. The catalyst, emulsifier and monomer charge may all be added initially or one or more may be added incrementally as polymerization proceeds.

The temperature of the polymerization is not critical and may be varied at the choice of the operator. Where a temperature below 0° C. is used, a freezing point depressant, as ethylene glycol, must be added to the water. The polymerization may be conducted at atmospheric pressure or with the application of high pressures. Optimum polymerization times will vary inter alia with the nature of the catalyst, with the temperature and pressure and with the degree of completeness to which it is desired to carry the polymerization.

If desired, up to about 5 percent by weight of one or more additional monomers may be copolymerized with the acrylonitrile and vinylidene chloride. Any of the comonomers described in the literature as copolymerizable with acrylonitrile may be used, particularly those described for use in producing acrylic and modacrylic fibers. Such comonomers are generally selected to improve dyeability, spinnability, or other processing characteristics. To maximize ultraviolet stability the copolymers suitable for emulsion spinning as herein described must have a molecular weight sufficiently high to give an intrinsic viscosity in dimethylformamide of at least 2.0 deciliters per gram.

The latex must be filtered prior to spinning. The spinning operation itself can be tube spinning, vertical spinning or horizontal spinning. The yarn speed and length of travel in the coagulation bath should be adjusted to provide a residence time of from 0.2–10 seconds. It is preferred to have a residence time of at least 2 seconds. If desired, the filaments can be jet stretched from 8–12 times or more. After the coagulation bath, the fibers can be washed with water and then taken up. Preferably, the filaments are first put through two or more baths of successively lower concentration of nitric acid. For optimum tensile properties, the filaments are dried, then stretched (either dry or in the presence of steam) from 5–15 times their original length at a temperature of 150° to 250° C. The filaments can be colored by incorporating pigments or dyes which are not sensitive to nitric acid. Premetallized dyes, basic dyes and dispersed dyes can be used in normal dyeing operations. Moreover, by the incorporation of a minor amount, i.e. less than 5 percent, of an appropriate monomer (such as 2-methyl 5-vinyl pyridine), in the copolymer, the dyeability of the resulting filaments may be modified.

The yarn so produced may be used as a multi-filament in conventional textile constructions, may be chopped to staple and spun into yarn, and generally used in all applications where acrylic and modacrylic fibers have proven useful. In addition, the surprisingly higher stick temperature, higher ultraviolet stability and nonflammability open up other uses in outdoor durable fabrics, etc.

To assist those skilled in the art to practice the present invention, the following modes of operation are suggested by way of illustration. All parts are by weight unless otherwise stated.

EXAMPLE 1

A glass-lined reaction vessel is charged with 6,000 parts of water, 40 parts sodium lauryl sulfate, 1,000 parts of acrylonitrile and 4.6 parts of concentrated sulphuric acid. The mixture is purged with nitrogen for 2 hours. Then 1,000 parts vinylidene chloride, 37.5 parts of a 1 percent aqueous solution of ethylenediamine tetracetic acid and 25 parts of a 1 percent aqueous solution of ferrous sulfate heptahydrate are added. The mixture is heated to 35° C. and 30 parts each of a 4.22 percent aqueous solution of $K_2S_2O_8$ (catalyst) and of a 5.0 percent aqueous solution of $Na_2S_2O_5$ (reducing agent) are added in three portions over 3½ hours. At this time a premix of 670 parts acrylonitrile, 670 parts vinylidene chloride, 2,000 parts water and 26.8 parts sodium lauryl sulfate is added followed by 22.5 parts of the aqueous catalyst solution and 15.0 parts of the aqueous reducing agent solution in two portions over a period of 3½ hours. The addition of identical amounts of premix, catalyst and reducing agent is repeated in the same manner twice more. The temperature during the reaction is maintained between 36° and 42° C. After stirring overnight, the latex has the following properties: conversion 91.5 percent, solids 30.6 percent, pH 2.7, surface tension 39 dynes/cm, viscosity 4.6 cps. The polymer has an intrinsic viscosity (in dimethylformamide) of 2.3 deciliters/gm.

The emulsion is vertically spun through a 25-hole glass capillary spinneret constructed as disclosed in U.S. Pat. No. 3,156,950 to Walton. The capillaries each have an internal diameter of 12 mils each, and are 2.5 cm. long. The coagulation bath contains 68 percent nitric acid maintained at a temperature of 93° C. The spinneret is cooled with water at a temperature of 22° C. The yarn path through the coagulation bath is 33 cm. The latex delivery rate is 9.4 gm./min. Yarn take-off rate is 7.47 meters per minute over a water-wetted godet. The multi-filament bundle or yarn departs from the godet and passes successively through a water bath at a temperature of 40° C. (residence time of 1.3 minutes), a second water bath at a temperature of 50° C. (residence time of 1.7 minutes) and then over a first dry godet at a temperature of 72° C. (residence time of 3.3 minutes) and a second dry godet at a temperature of 150° C. (residence time of 0.7 minutes). The surface speed of the delay rolls in the two water baths and of the two dry godets is 8.23 meters per minute. From the second dry godet the yarn is stretched eight times its original length in the presence of steam at a temperature of 200° C. The yarn so produced is approximately 431 denier (25 filaments), 18.0 denier per filament, has a tenacity of 4.4 gm./denier and an elongation of 12.2 percent.

EXAMPLE 2

A polymer is produced and spun in the manner of example 1 excepting that a seven-hole spinneret (7.5 mil I.D.) is used. The resulting fiber has a composite denier of about 70, a tensile strength of 5.2 gm./denier and an elongation of 10 percent.

EXAMPLE 3

A copolymer produced and spun as in example 1 is compared to two commercial modacrylic fibers termed "X" and "Y" respectively. X is described in the literature as containing 40 percent acrylonitrile and 60 percent vinyl chloride while Y is described as having 60 percent acrylonitrile and 40 percent vinylidene chloride. Both fibers are believed to contain minor amounts of modifying comonomers and are in the form of staple yarn. These yarns are compared for heat stability and for their solubility characteristics. The results are set forth in the following table:

TABLE 1

|  | Orig. tensile | 150° C. | | 200° C. | | Solubility in acetone |
|---|---|---|---|---|---|---|
|  |  | Percent shrinkage | tensile | Percent shrinkage | tensile |  |
| Copolymer fiber | 5.6 | 3–5 | 4.9 | 15 | 3.9 | Insol. |
| X | 2.8 | 15 | 2.4 | 79 | (¹) | Sol. |
| Y | 2.6 | 2 | 2.5 | 50 | 1.0 | Sol. |

¹ Too weak to measure.

EXAMPLE 4

Three fibers, A, B and C, are prepared and spun as in example 1 excepting that fiber A is prepared using only 2 percent sodium lauryl sulphate as the surfactant, while fibers B and C are prepared using 4 percent sodium lauryl sulphate. Fiber C further differs from fibers A and B in that it contains 0.6 percent titanium dioxide. The stick temperatures of the fibers so prepared are then compared with those of the two commercial modacrylics X and Y described in example 3 and to an additional commercial modacrylic, termed "Z," which is described in the literature as containing 50 percent acrylonitrile and 50 percent vinylidene chloride and is in the form of a continuous filament bundle or yarn. The test for stick temperature uses a 20 gm. weight with a coating of polytetrafluoroethylene on the bottom surface, A temperature gradient is established on a silver-coated copper bar, the fiber sample is placed on the bar, the weight is placed on the sample for 15 seconds, removed, and then a camel's hair brush is used to detach the fiber. The lowest temperature at which the brush cannot sweep the fiber from the silver surface is the stick temperature. The results are set forth in the following table:

TABLE II

| A | 161°C. |
| B | 155° |
| C | 154° |
| X | 124° |
| Y | About 140° |
| Z | 117° |

EXAMPLE 5

A fiber is prepared and spun as described in example 1. It is then tested in comparison with the modacrylic fibers X and Y described in example 3 for ultraviolet stability using a Fadeometer equipped with fluorescent sunlight lamps. The device is constructed and operated as described in ASTM D1501-57T. The following table III sets forth the percent of the original tenacity retained by the fibers.

TABLE III

| Copolymer Fiber | X | Y |
|---|---|---|
| 480 hours | 80 | TWTT* | 18 |
| 960 hours | 74 | TWTT | TWTT |

*Too weak to test.

EXAMPLE 6

A series of copolymers are prepared and spun as described in example 1 (excepting that the ratio of acrylonitrile to vinylidene chloride is varied) and the behavior of the filaments as respects cementation during the multifilament spinning is observed. A copolymer of 50 percent acrylonitrile and 50 percent vinylidene chloride shows no cementation nor does a copolymer of 55 percent vinylidene chloride and 45 percent acrylonitrile. A copolymer of 60 percent acrylonitrile and 40 percent vinylidene chloride is partially cemented. A copolymer of 40 percent acrylonitrile and 60 percent vinylidene chloride is cemented. A copolymer of 90 percent acrylonitrile and 10 percent methyl methacrylate is cemented. Copolymers of 49 percent acrylonitrile, 49 percent vinylidene chloride and 2 percent of 2-methyl 5-vinyl pyridine, or of butyl acrylate or of methyl methacrylate are not cemented. When these last three copolymers are spun, the first wash bath contains 40 percent nitric acid. The copolymer with 2 percent of 2-methyl 5-vinyl pyridine is particularly easy to spin. However, the fibers produced have reduced high temperature and ultraviolet stability.

EXAMPLE 7

A series of three latexes are prepared as in example 1, each having 50 percent acrylonitrile and 50 percent vinylidene chloride but differing in molecular weight. Latex A is of a high molecular weight copolymer having an intrinsic viscosity of 2.4 dl/gm.; latex B is of an intermediate molecular weight copolymer having an intrinsic viscosity of 1.7 dl/gm.; and latex C is of a low molecular weight copolymer having an intrinsic viscosity of 0.90 dl/gm. Monofilaments are spun from each latex using the process described in example 1. The fibers are then exposed for 960 hours in a fadeometer containing a xenon arc light. At the end of this time the fibers are removed from the fadeometer and the tenacity determined. The following table IV sets forth the percentage of the original tenacity retained under these conditions:

TABLE IV

| Latex | Denier | Tenacity Retained |

| A | 31 | 58% |
| B | 29 | 29% |
| C | 27 | 33% |

It is significant that there is no regular progression of improved photostability as a functional molecular weight, the intermediate molecular weight material (latex B) showing no improvement over the lower molecular weight material (latex C).

The ability of the present compositions to be multi-filament spun without cementation is not understood. It is believed to be due to the formation of "skin" in the coagulation bath under the strongly oxidizing conditions which exist there. Micrographs of fiber cross-sections show the skin in a detached or semi-detached form. The skin apparently forms completely in the coagulation bath and does not grow any more during the remainder of the process. The thickness of the skin is related to the anionic surfactant level. At 4 percent anionic surfactant, the skin may constitute as much as 7 percent of the cross-sectional area (this is an estimate, no precise measurement having been made) while at 1 percent anionic surfactant or less the skin is not thick enough to be detected easily in a micrograph. However, even at low anionic surfactant levels, multi-filament spinning proceeds without cementation indicating that skin is present. Prior to hot drying, the skin is soluble in acetone while the main body of the fiber is not. (This is for the acrylonitrile:vinylidene chloride copolymer. In the case of the terpolymer with 2 percent 2-methyl 5-vinyl pyridine, the entire terpolymer is acetone-soluble.) Chemical analysis of the acetone-soluble portion gives a nitrogen content of 8.5 percent and a chlorine content of 26 percent as compared to a nitrogen content of 12.3 percent and a chlorine content of 32.7 percent for the main body of the fiber (i.e., what remained after acetone extraction). The theoretical values for nitrogen and chlorine are 13.2 percent and 36.6 percent, respectively. A reduction in chlorine and nitrogen of this order of magnitude, i.e., of at least 20 percent by weight, indicates a significant chemical change.

Many variations of the invention will be apparent to those skilled in the art. Thus, acid-resisting materials having a solubilizing effect on the copolymer may be added to the coagulating bath to promote coalescence of the latex particles and thus reduce the residence time. For example, an appropriate inorganic salt such as magnesium bromide or nitrate, lithium nitrate, etc. may be used which also permits the use of higher temperatures in the coagulation bath.

In another variation of the invention, a second latex of a different copolymer may be blended with the acrylonitrile:vinylidene chloride latex prior to spinning. The copolymer thus incorporated in the fiber desirably imparts a particular property to the fiber, as improved dyeability, anti-static properties, etc. Such a different copolymer may constitute (depending, of course, on the monomer constituents) a larger portion of the resulting fiber than would be the case for third monomers copolymerized with the vinylidene chloride:acrylonitrile without drastically affecting the skin, high temperature stability and light stability of the fibers. Thus up to 10 percent or more of a copolymer may be incorporated with the primary copolymer by this blending process. As is apparent, the surfactants in the two latexes must be compatible.

As used herein, "anionic surfactants" refers only to acid-sensitive sulfate and sulfonate surfactants.

We claim:

1. A process adapted to spin a multi-filament bundle or yarn of modacrylic fibers without cementation comprising extruding an aqueous dispersion of a copolymer containing 0.3 to 6 percent by weight, based on the weight of the copolymer, of an anionic, acid-sensitive surfactant through a multi-hole spinneret into a coagulating bath containing 65 to 70 percent nitric acid by weight maintained at a temperature of 75° to 100° C., said copolymer having an intrinsic viscosity in dimethylformamide of at least 2.0 deciliters per gram and containing at least 45 percent by weight vinylidene chloride, at least 45 percent by weight acrylonitrile and no more than 5 percent by weight of at least one other monomer copolymerizable with acrylonitrile withdrawing the filaments from the coagulation bath, washing and drying the fibers.

2. A process according to claim 1 wherein the fibers are stretched from 5–15 times.

3. A process according to claim 1 wherein the copolymer contains 50 percent vinylidene chloride and 50 percent acrylonitrile by weight.

4. A process according to claim 1 wherein the coagulating bath is constant boiling nitric acid at a temperature of at least 90° C.

5. A process according to claim 1 wherein the coagulating bath contains an acid-stable, inorganic metal salt, said salt having a solubilizing effect on said copolymer.

6. A process according to claim 1 wherein a latex of a second copolymer is blended with the latex of the vinylidene chloride:acrylonitrile copolymer, said second copolymer constituting no more than 10 percent by weight of the fiber.

7. A process according to claim 1 wherein the filaments are washed in at least one bath of dilute nitric acid followed by at least one water wash.

8. A process according to claim 1 wherein after drying and before take-up the fibers are stretched from 5–15 times in the presence of steam at a temperature of 150°–250° C.

9. A process according to claim 1 wherein the latex contains from 1–4 percent by weight of a sulfate or sulfonate anionic surfactant.

10. A process according to claim 1 wherein the copolymer contains 45 to 55 percent by weight of vinylidene chloride and 55 to 45 percent by weight of acrylonitrile respectively.

* * * * *